May 6, 1947.  S. N. WEKEMAN  2,420,023
CHANGEABLE LENS AND FILTER STRUCTURE FOR COPY CAMERAS
Filed April 29, 1943  15 Sheets-Sheet 1

INVENTOR
STEPHEN N WEKEMAN
BY
Ward, Crosley & Neal
ATTORNEYS

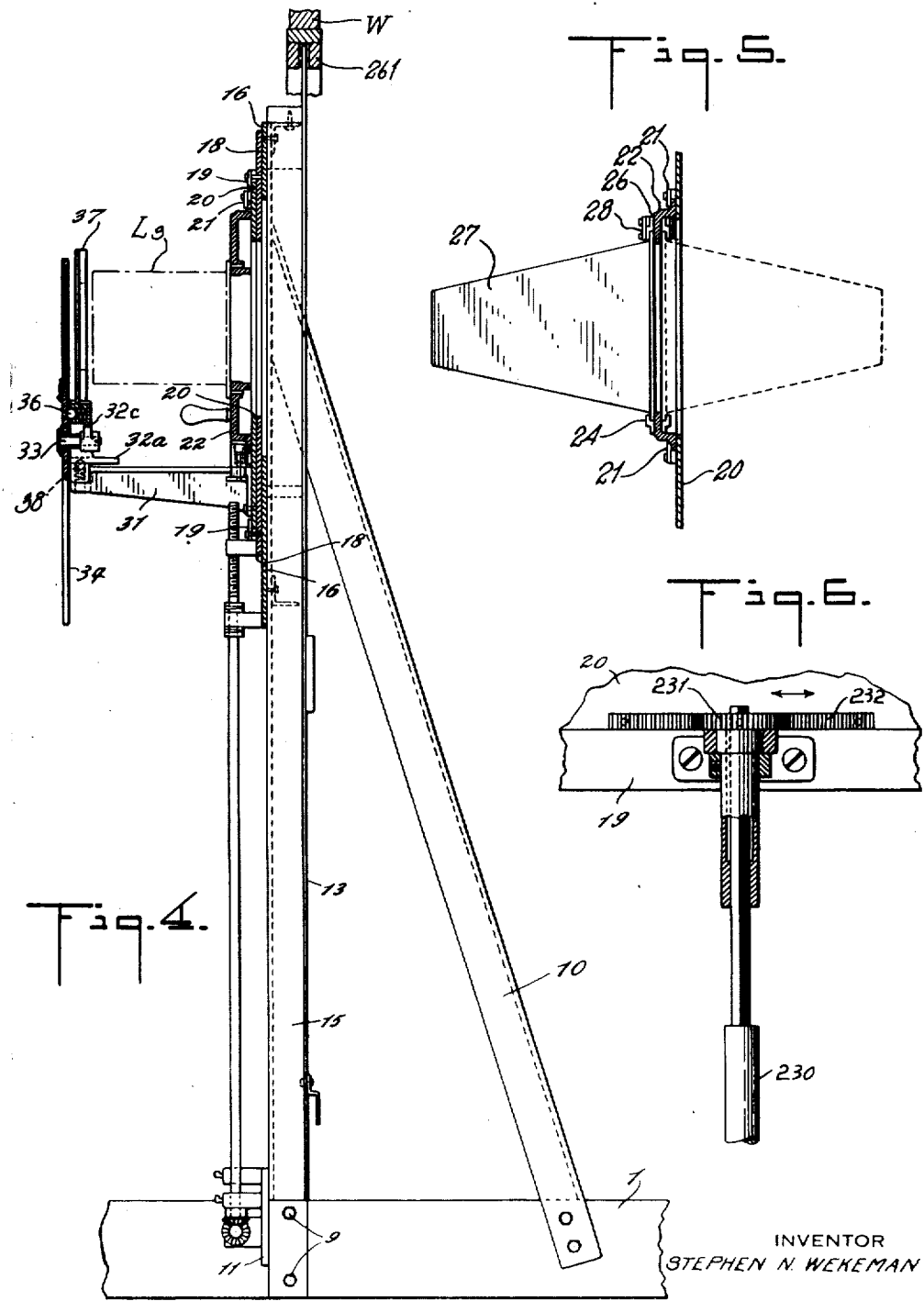

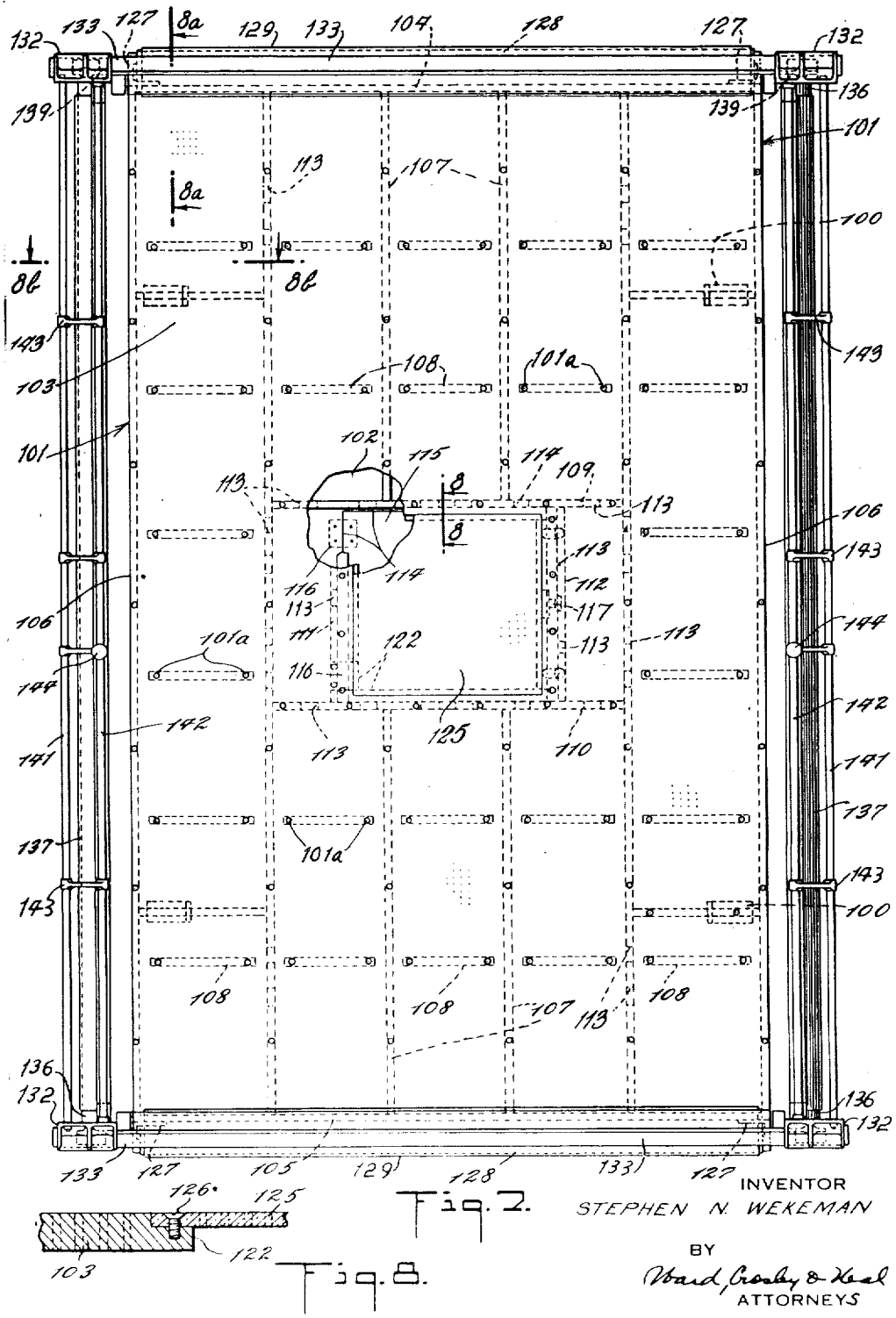

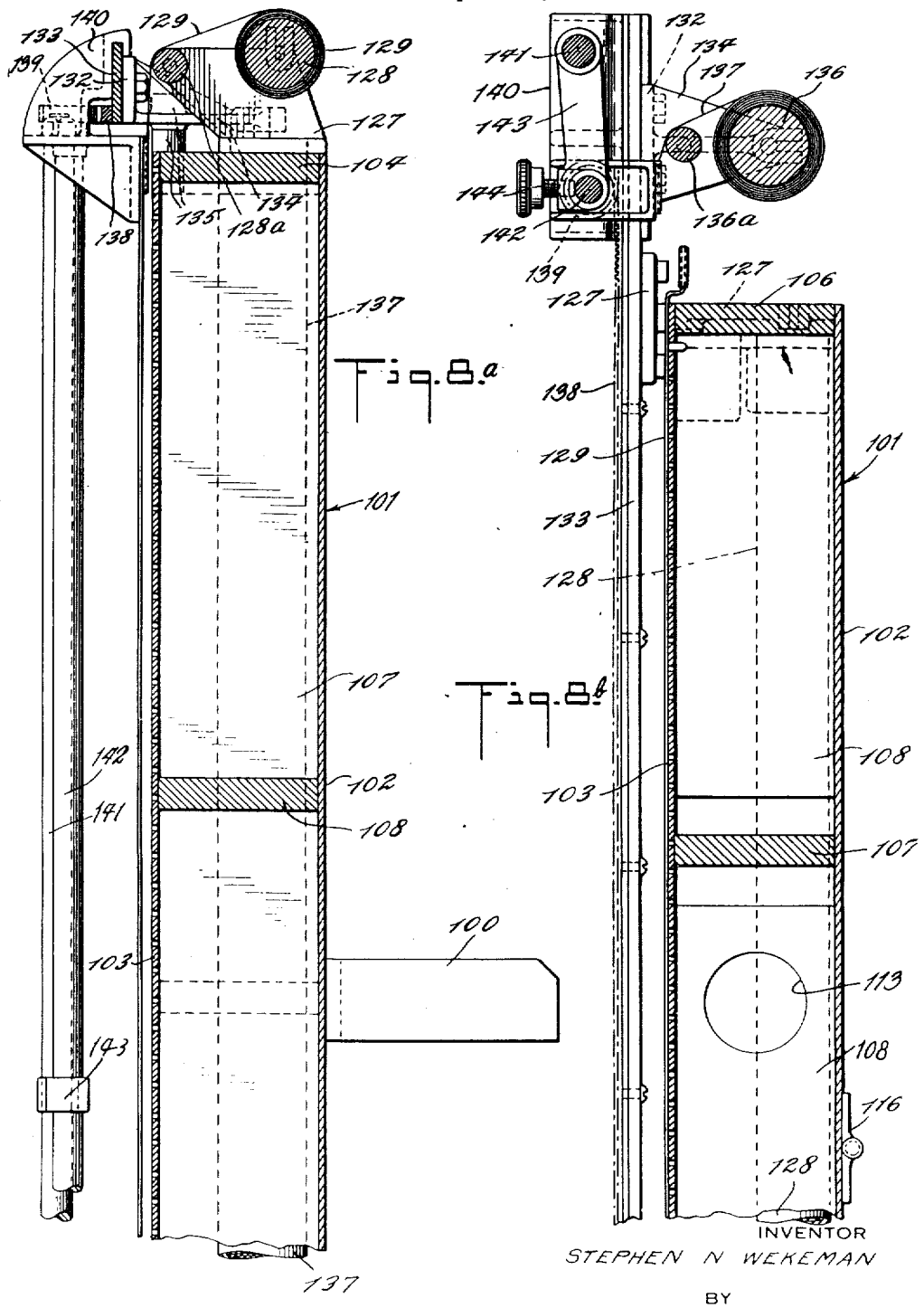

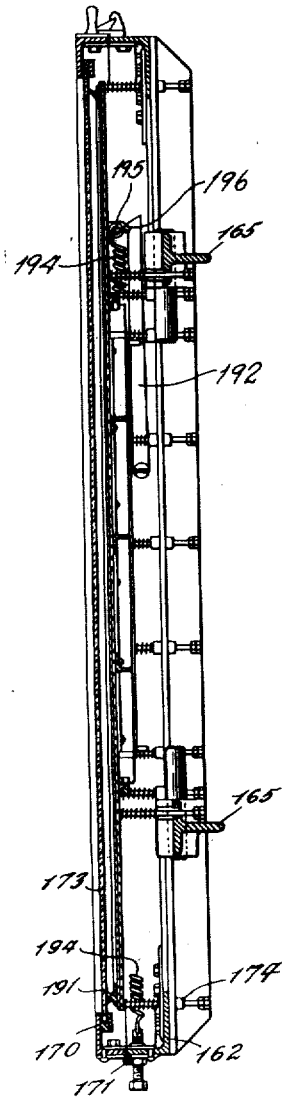
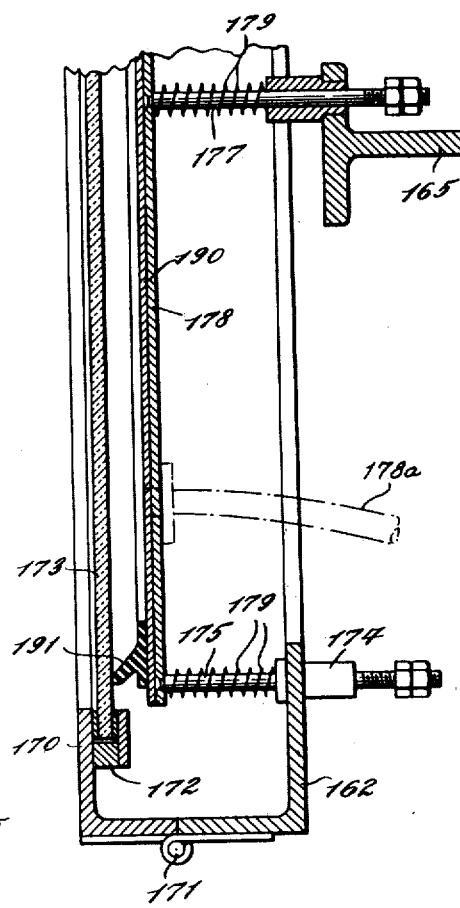
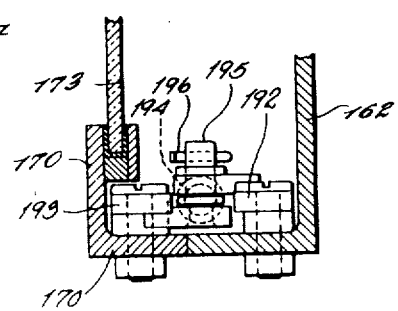
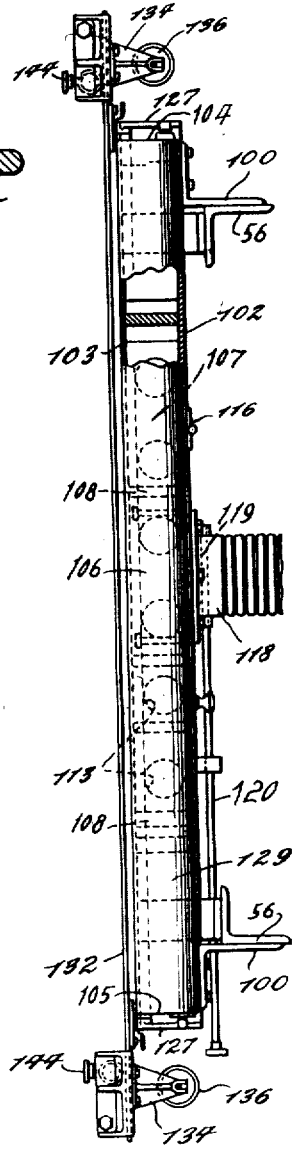

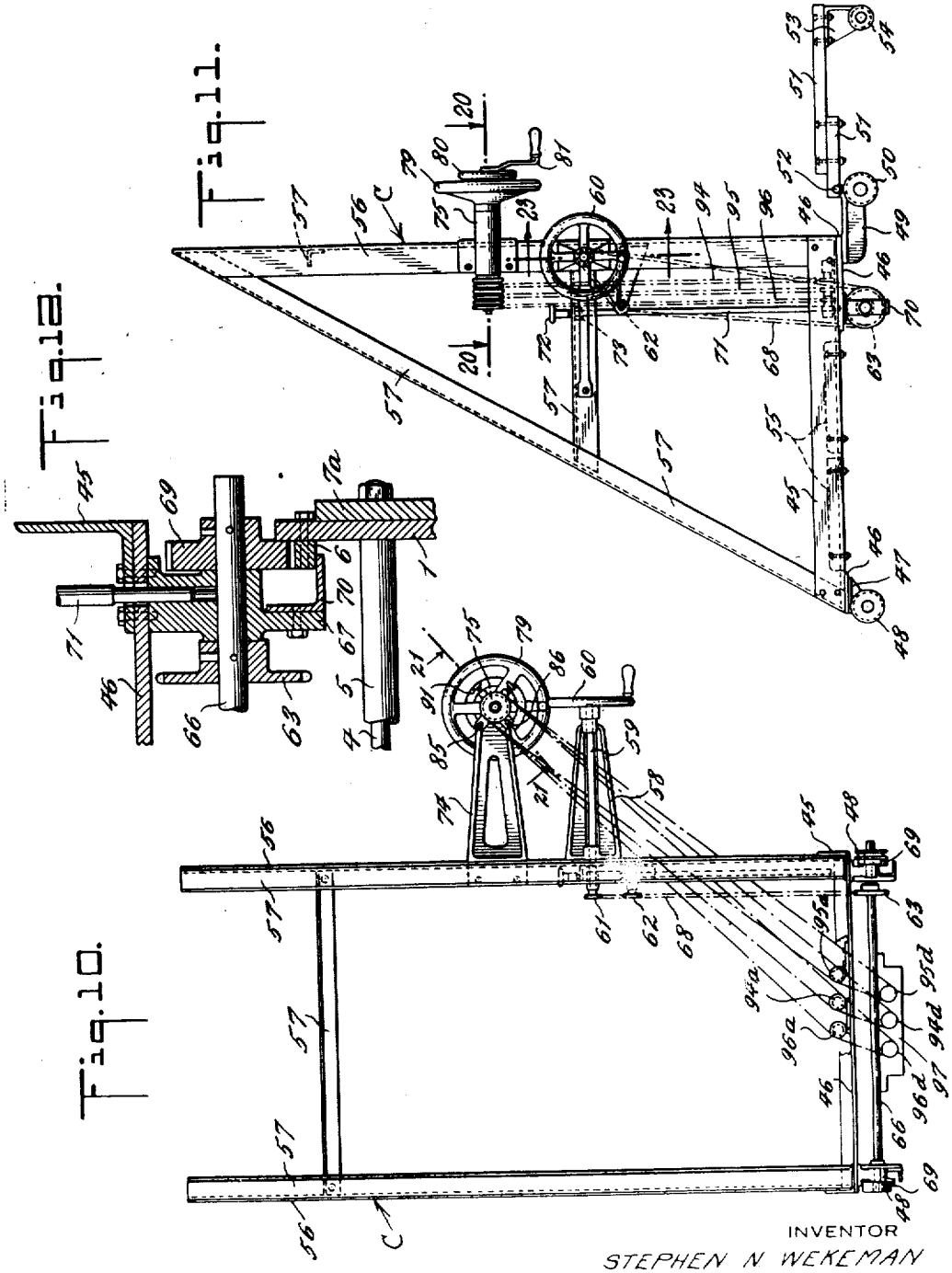

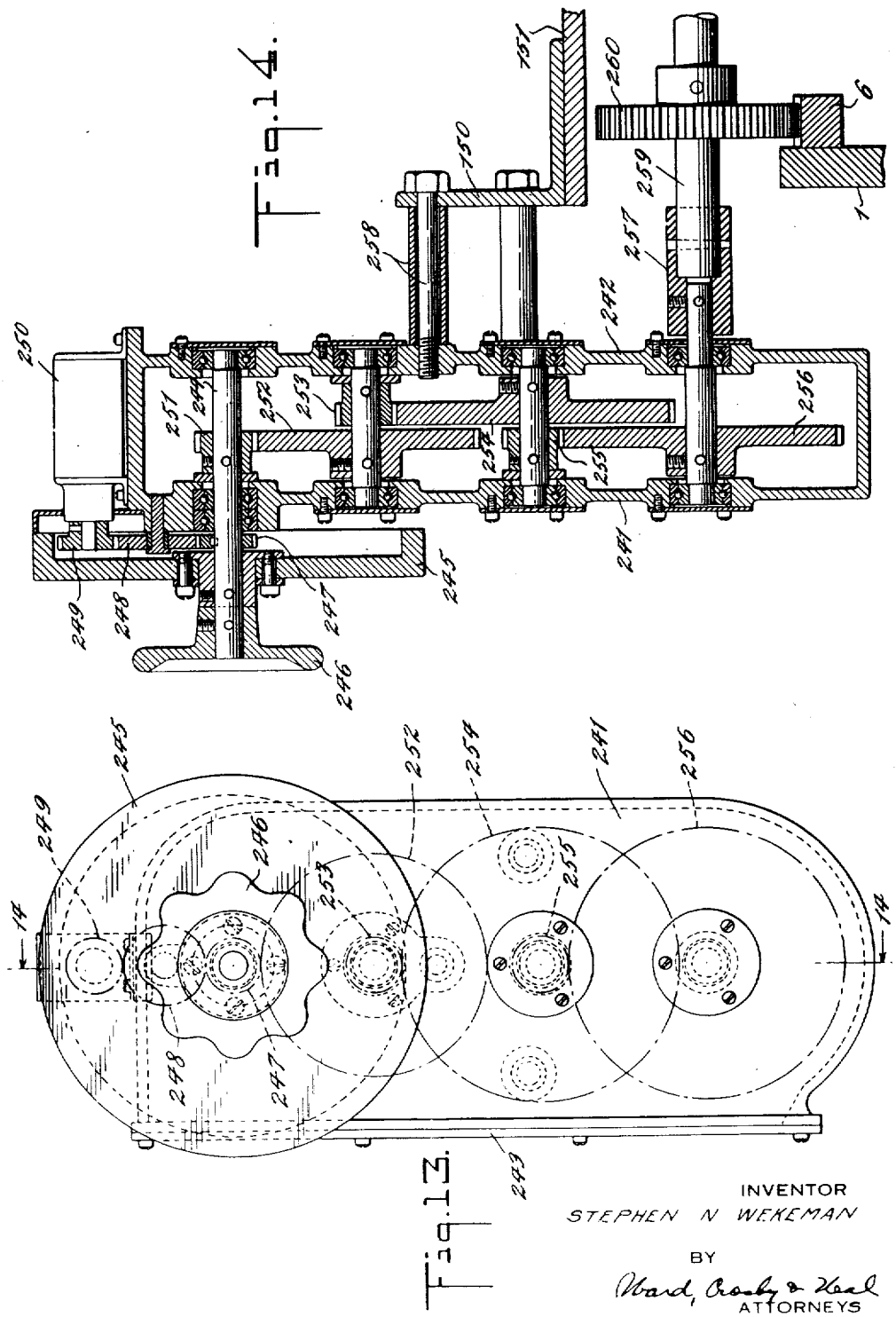

May 6, 1947. S. N. WEKEMAN 2,420,023
CHANGEABLE LENS AND FILTER STRUCTURE FOR COPY CAMERAS
Filed April 29, 1943 15 Sheets-Sheet 10
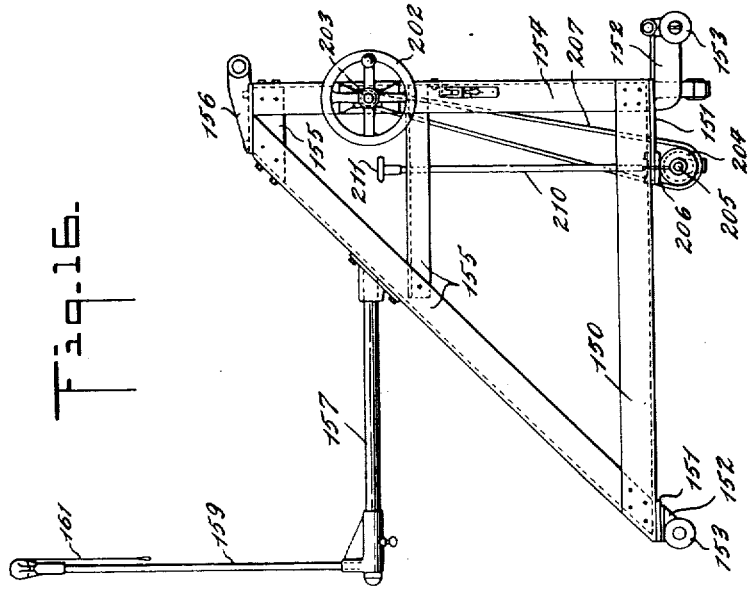
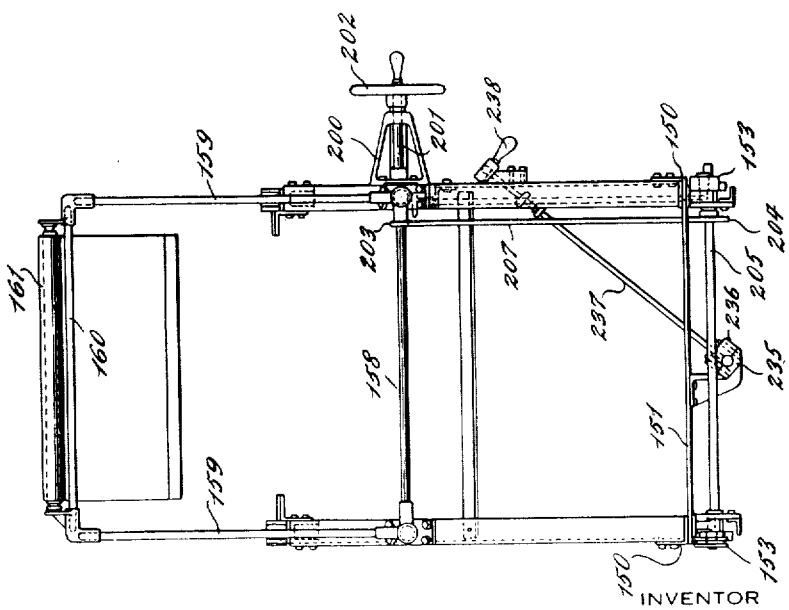
INVENTOR
STEPHEN N WEKEMAN
BY
Ward, Crosby & Neal
ATTORNEYS

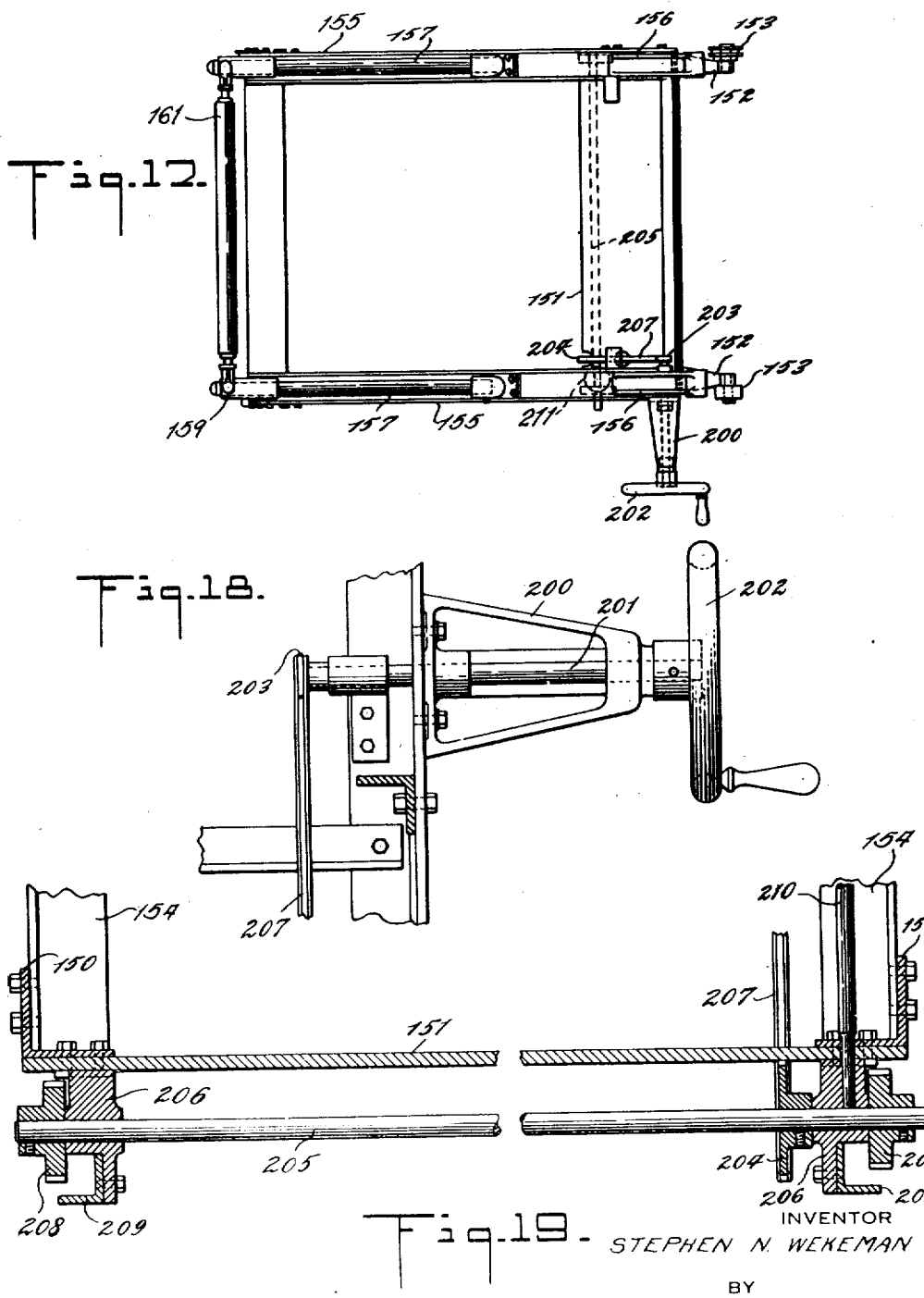

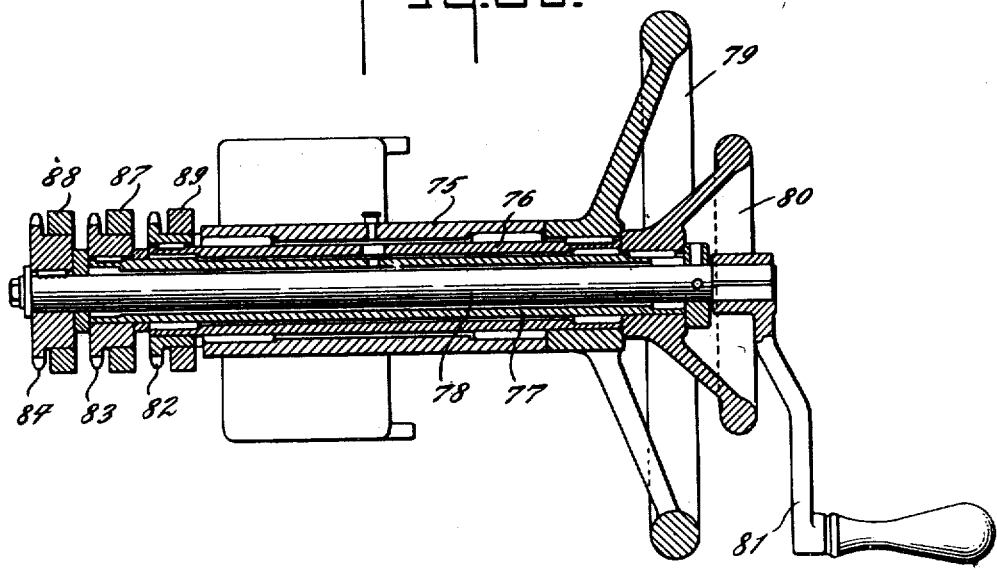

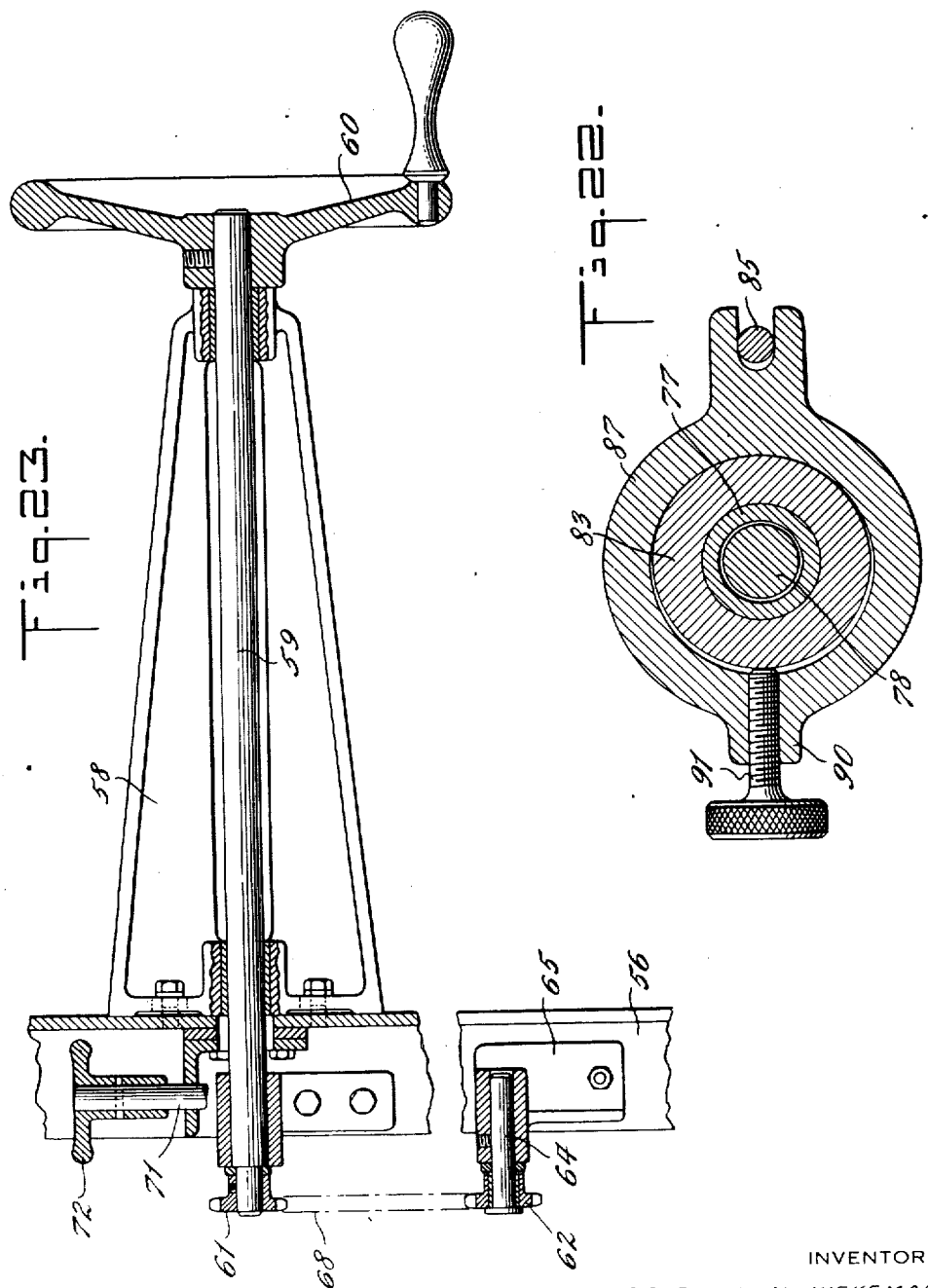

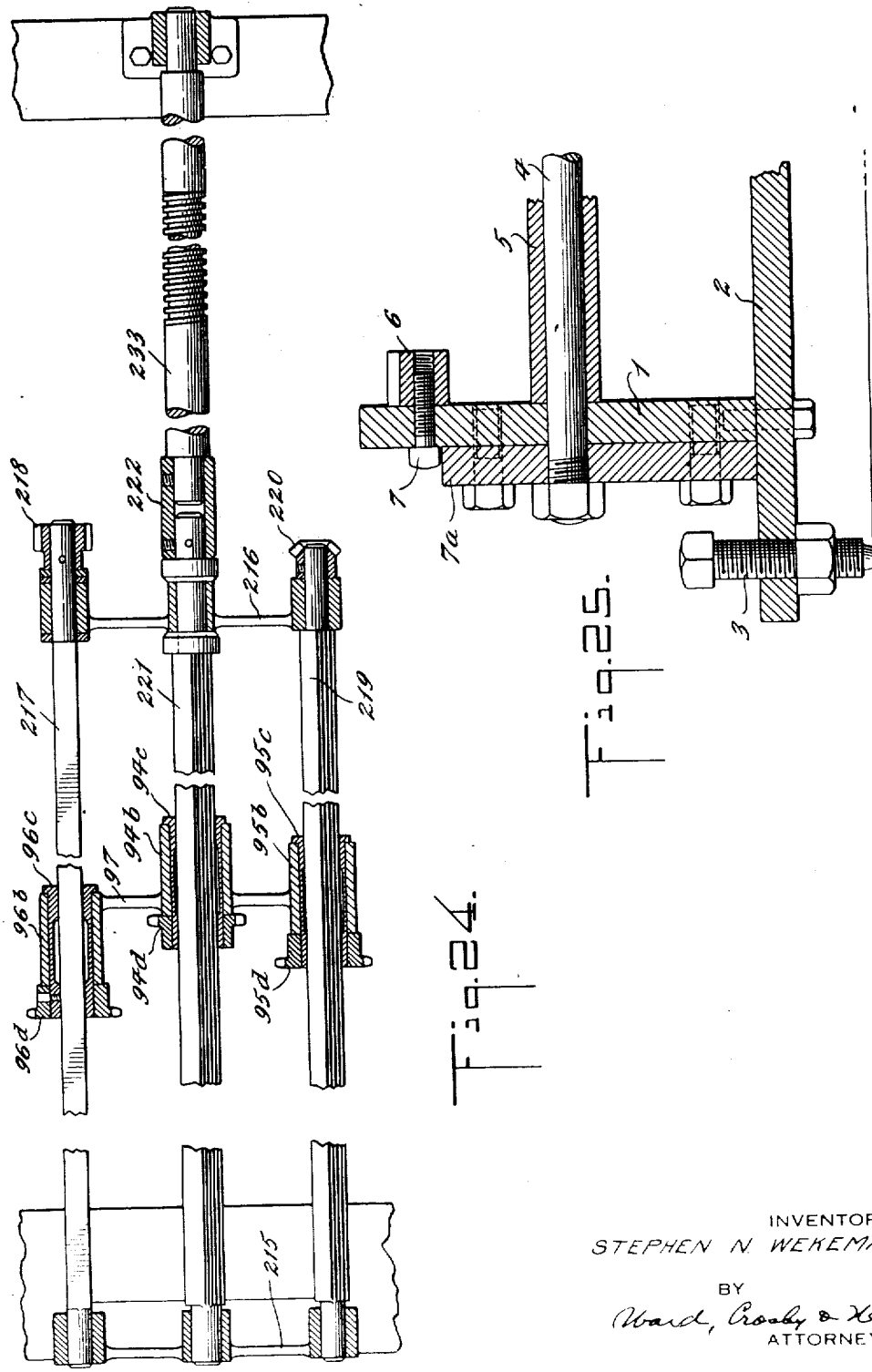

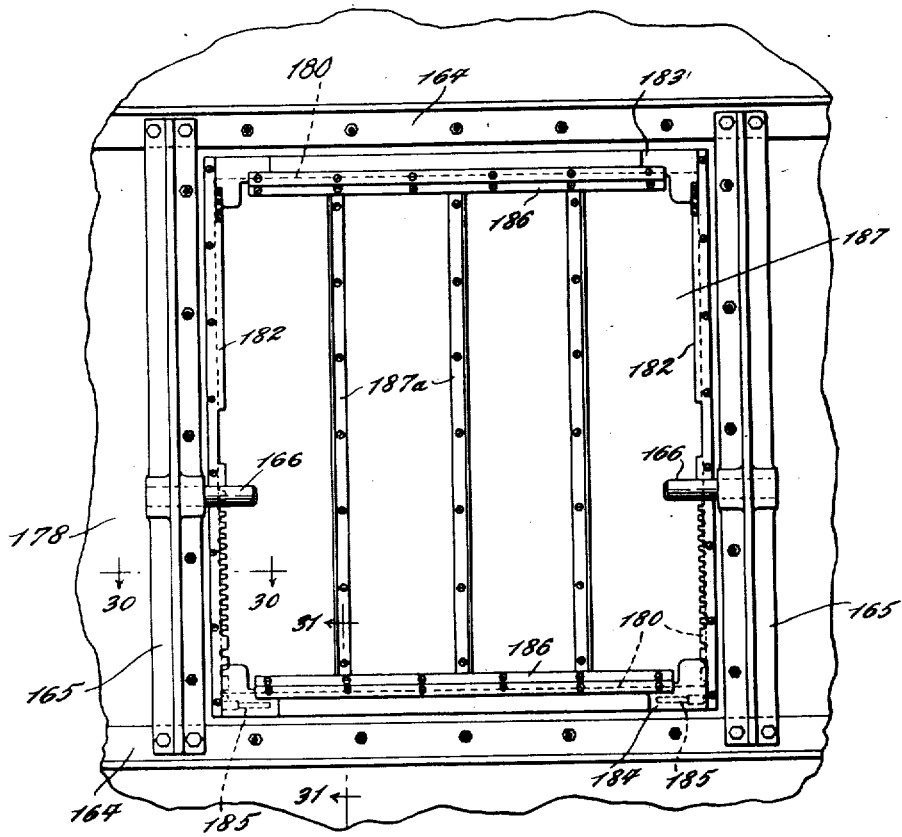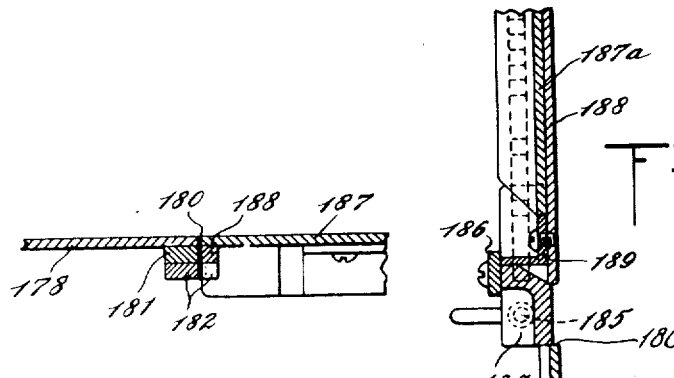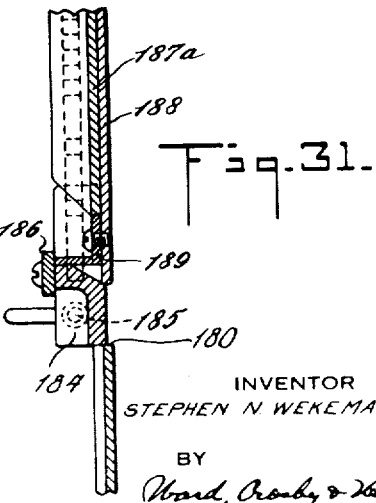

Patented May 6, 1947

2,420,023

UNITED STATES PATENT OFFICE 2,420,023

CHANGEABLE LENS AND FILTER STRUCTURE FOR COPY CAMERAS

Stephen N. Wekeman, Saddle River Township, Bergen County, N. J., assignor to Sun Chemical Corporation, a corporation of Delaware Application April 29, 1943, Serial No. 485,004

4 Claims. (Cl. 88—24)

My invention relates to cameras.

In accordance with my invention, a novel arrangement is provided in a camera for controlling movement of a lens-carrying slide by operation of mechanism supported by the carriage for the light-sensitive member.

Subject matter described but not claimed herein forms the subject matter of my copending applications Serial No. 651,212, filed March 1, 1946, for "Copy holder," and Serial No. 651,213, filed March 1, 1946, for "Suction housing."

Various other objects, advantages and features of my invention will become apparent from the following detailed description.

My invention resides in the camera, control mechanism, arrangements and combinations of the character hereinafter described and claimed.

For an understanding of my invention and for an illustration of one of the forms thereof, reference is to be had to the accompanying drawings, in which:

Fig. 4 is a vertical sectional view, partly in elevation, taken substantially on the line 4—4 of Fig. 3 looking in the direction of the arrows;

Fig. 5 is a vertical sectional view, partly in elevation, taken on the line 5—5 of Fig. 3 looking in the direction of the arrows;

Fig. 6 is an elevational view, partly in section, showing a detailed feature of the invention;

Fig. 7 is an elevational view showing the front of the suction housing;

Fig. 8 is a detailed sectional view taken on the line 8—8 of Fig. 7 looking in the direction of the arrows;

Fig. 8a is an enlarged, vertical sectional view taken on the line 8a—8a of Fig. 7 looking in the direction of the arrows;

Fig. 8b is an enlarged, horizontal sectional view taken on the line 8b—8b of Fig. 7 looking in the direction of the arrows;

Fig. 9 is a plan view of the suction housing;

Fig. 10 is a rear elevational view of the suction housing carriage;

Fig. 11 is a side elevational view of the carriage shown in Fig. 10;

Fig. 12 is an enlarged vertical sectional view, partly in elevation, showing the drive mechanism for the carriage illustrated in Figs. 10 and 11;

Fig. 13 is an elevational view showing the vernier mechanism of my invention;

Fig. 14 is a vertical sectional view, partly in elevation, taken on the line 14—14 of Fig. 13 looking in the direction of the arrows;

Fig. 15 is an elevational view showing the rear of the copy holder carriage;

Fig. 16 is a side elevational view of the carriage shown in Fig. 15;

Fig. 17 is a plan view of the carriage shown in Figs. 15 and 16;

Fig. 18 is an enlarged elevational view, partly in section, showing a part of the drive mechanism for the copy holder carriage;

Fig. 19 is an enlarged, vertical sectional view, partly in elevation, showing another part of the drive mechanism for the copy holder carriage;

Fig. 20 is a horizontal sectional view, partly in plan, taken on the line 20—20 of Fig. 11 looking in the direction of the arrows;

Fig. 21 is an enlarged horizontal sectional view taken on the line 21—21 of Fig. 10 looking in the direction of the arrows;

Fig. 22 is an enlarged vertical sectional view, partly in elevation, taken on the line 22—22 of Fig. 21;

Fig. 23 is an enlarged sectional view, partly in elevation, taken substantially on the line 23—23 of Fig. 11 looking in the direction of the arrows;

Fig. 24 is a plan view, partly in section, showing part of the drive mechanism of the invention;

Fig. 25 is an enlarged vertical sectional view, partly in elevation, showing a part of the camera track mechanism;

Fig. 26 is a horizontal sectional view, partly in plan, taken substantially on the line 26—26 of Fig. 1 looking in the direction of the arrows;

Fig. 27 is an enlarged sectional view showing a detailed feature of the invention;

Fig. 28 is a vertical sectional view, partly in elevation, taken substantially on the line 28—28 of Fig. 1 looking in the direction of the arrows;

Fig. 29 is an enlarged elevational view showing a feature of the invention;

Fig. 30 is a horizontal sectional view, partly in plan, taken on the line 30—30 of Fig. 29 looking in the direction of the arrows; and Fig. 31 is a vertical sectional view, partly in elevation, taken on the line 31—31 of Fig. 29 looking in the direction of the arrows.

Figure 1:
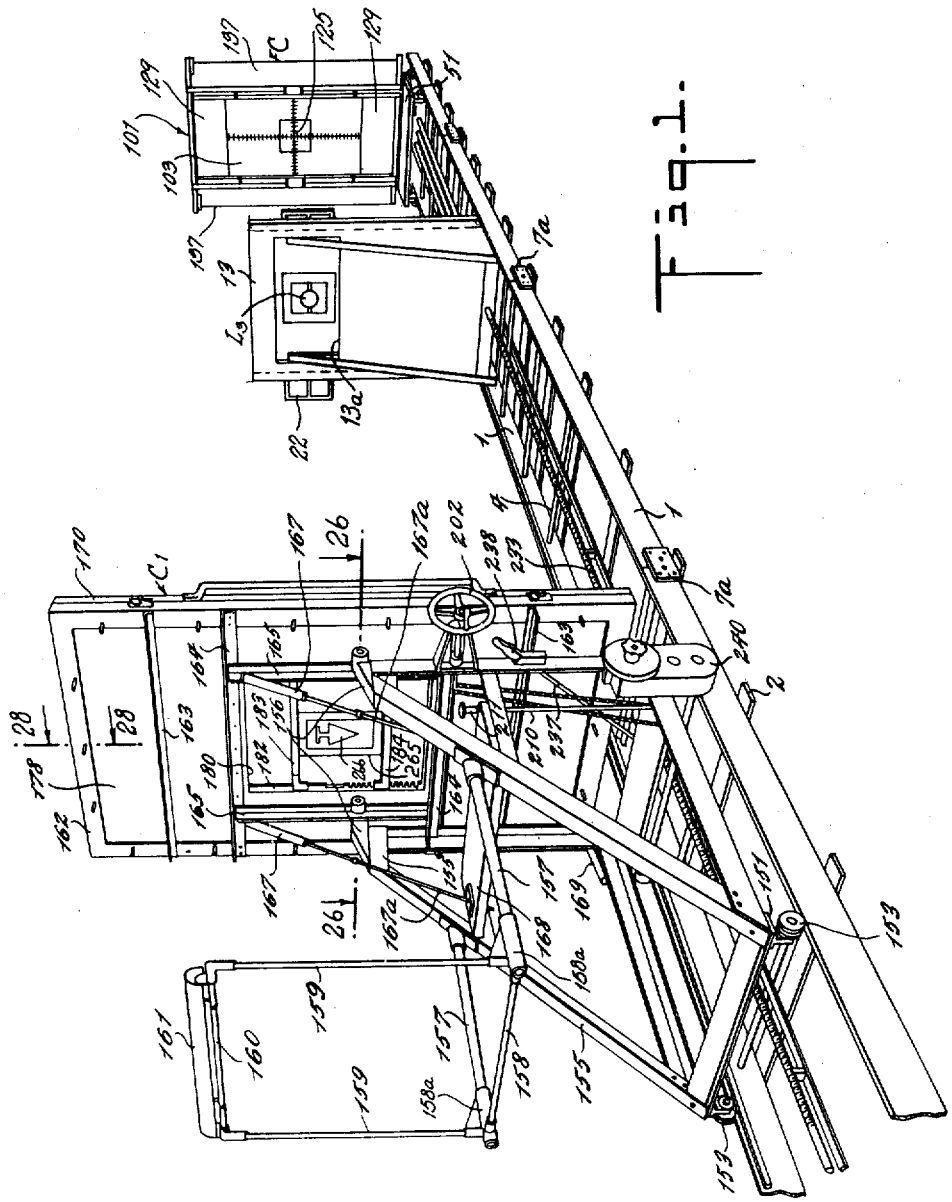
Figure 1 is a perspective view showing the camera of my invention.
Figure 2:
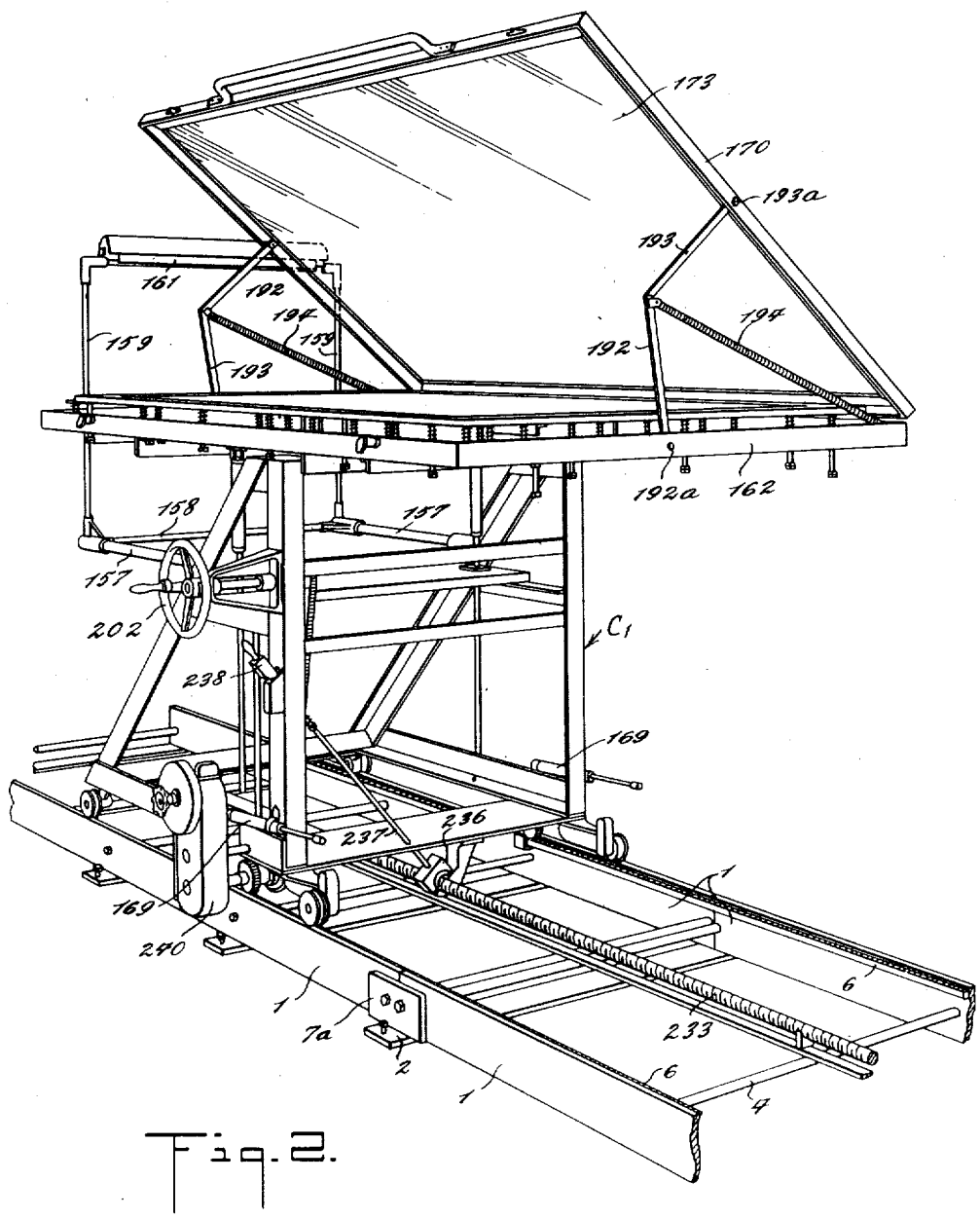
Fig. 2 is a perspective vew showing a part of the camera illustrated in Fig. 1.

Referring to Figs. 1, 2 and 25, I have shown a base B which comprises a pair of parallel tracks 1, 1 supported by cross ties 2 which, as shown, carry adjusting screws 3 engageable with the floor or other supporting surface and being utilizable for leveling purposes. The tracks 1, 1 are braced by tie rods 4 each of which carries a spacing sleeve 5, Fig. 25. Each of the tracks 1 has associated therewith a horizontal rack 6 which is secured thereto by screws 7. As indicated in Figs. 1 and 25, adjacent sections of each of the tracks 1 are secured together by plates 7a which are bolted in position in any suitable manner.

Figure 3:
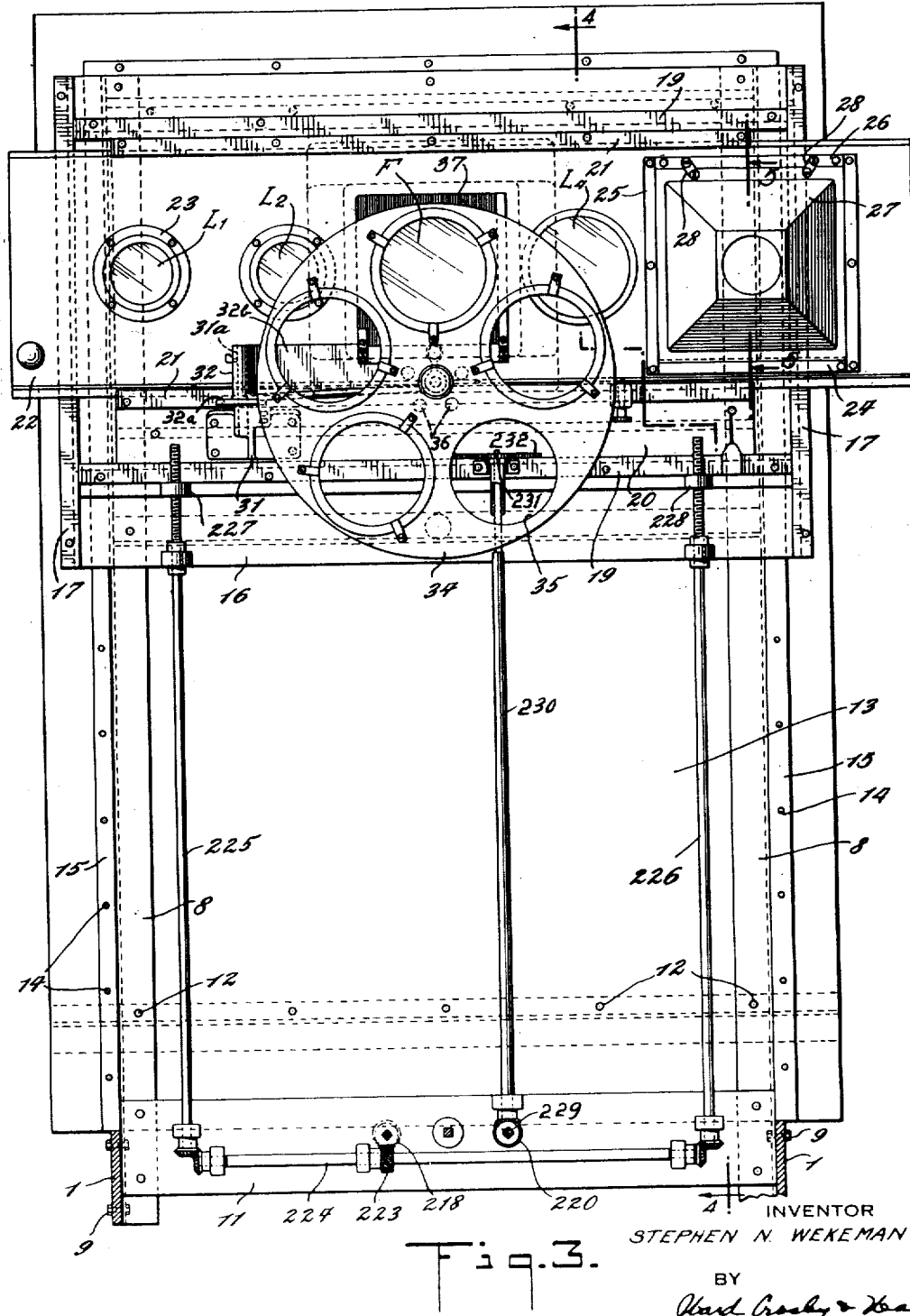
Fig. 3 is an elevational view, partly in section, showing the camera lens board together with some of the optical elements carried thereby.

Referring particularly to Figs. 3 and 4, the tracks 1, 1 are shown as having a pair of members or standards 8, 8 such as angle irons secured thereto by bolts 9, the standards 8, 8 extending vertically in parallel relation and being braced by the respective inclined members 10 connected thereto and to the tracks 1 and 1, respectively. Extending horizontally between the tracks 1, 1 and suitably secured to the lower ends of the standards 8, 8 on one side thereof is a plate 11 utilizable as hereinafter described. Secured, by screws 12, to the other side of the standards 8, 8 is a shield plate 13 to which, by screws 14, a pair of fastening members 15, 15 are secured, these fastening members being secured to the outside of the respective standards 8, 8.

Secured in suitable manner to the standards 8, 8 is a frame plate 16 which, at the respective opposite sides thereof, has suitably secured thereto the vertical side tracks 17, 17 which guide a frame plate 18 for vertical movement. The frame plate 18 has suitably secured thereto the respective, horizontal upper and lower tracks 19, 19 which guide a plate 20 for horizontal movement. The plate 20 carries upper and lower horizontal tracks 21, 21 which guide a supporting slide 22 for horizontal movement.

As indicated in Fig. 4, each of the plates 16, 18 and 20 has an opening which extends horizontally between the standards 8 and 8, these openings being alined with each other and with an opening 13a formed in the shield plate 13, Fig. 1. The slide 22, in the example shown, has five horizontally alined openings which are alined individually with the aforesaid openings of the plates 16, 18 and 20. The four slide openings at the left, Fig. 3, are provided for four objective lenses L1, L2, L3 and L4 having different focal lengths, respectively, each lens being secured in fixed position by a housing 23 suitably secured to the slide 22.

The slide opening at the right, Fig. 3, is substantially larger than are the other openings thereof. At the lower side of this opening, there is a horizontal bracket 24 while, along the opposite respective sides thereof, side guides 25 are disposed, a top horizontal guide 26 being horizontally disposed at the top of said opening. A cone 27 has a bottom flange which fits into the bracket 24 and within the guides 25, 25 and 26, the cone 27 being secured in position by latches 28 pivoted to the top guide 26. The front wall of the cone 27 is provided with an opening in which an objective lens, not shown, is secured.

As indicated in Fig. 5, the rear surface of the slide 22 carries an arrangement corresponding with the bracket 24 and guides 25, 25 and 26 above described whereby the position of the cone 27 may be reversed on said slide 22.

The lower track 21 carries a holder 29 for a vertically movable spring-pressed plunger 30 adapted to cooperate with any one of five notches formed in the slide 22. These notches are so positioned that, when the slide 22 is moved by its handle 22a, the plunger 30 cooperates with a selected notch to releasably retain the slide 22 and thereby hold a selected objective lens in projecting position.

Secured to the aforesaid plate 20 is the base of a bracket arm 31 having an upstanding post 31a on which a sleeve 32 is loosely mounted for free oscillatory movement, the sleeve 32 comprising a base 32a seating on a flanged surface of the post 31a. Extending from the sleeve 32 is a horizontal arm 32b, Fig. 3, which terminates in an enlarged section 32c having a pin 33, Fig. 4, projecting horizontally therefrom. Freely rotatable on the pin 33 is a disk 34 having therein a plurality, five in the example shown, of apertures 35 adapted, in suitable manner, to have color filters F of different values mounted therein, respectively, said apertures 35 being circularly spaced in suitable relation around the pin 33 as an axis. The aforesaid enlarged section 32c of the sleeve arm 32a comprises a horizontal passage which faces the base of the disk 34 and which has disposed therein a spring-pressed ball 36, Fig. 4, adapted to cooperate with five detents formed in said base of the disk 34 and circularly spaced around the pin 33 in correspondence with the circular spacing of the apertures 35.

As shown in Fig. 4, a light shield 37 is supported in suitable manner on the upper surface of the sleeve arm 32a.

Referring to Fig. 4, the bracket arm 31, below the sleeve base 32a, comprises an upwardly opening passage in which is seated a spring-pressed ball 38 adapted to cooperate with a detent formed in the lower surface of said sleeve base 32a.

The aforesaid sleeve arm 32a is of the proper length for the pin 33 carried thereby to be positioned vertically below the axis of the projecting light beam. This position of the sleeve arm 32a is illustrated in Fig. 3 and, when thus positioned, the spring-pressed ball 38 cooperates with its detent to releasably retain said sleeve arm in the position illustrated. It will be understood that, against the pressure exerted by the ball 38, the sleeve 32 and its arm 32a may be swung on the post 31a to place the described color filter arrangement in a non-operative position.

With an arrangement of the character described, it will be understood that the disk 34, when positioned as shown in Fig. 3, may be rotated about the pin 33 as an axis to bring the center of any color filter F into the axis of the projecting light beam. The detents with which the spring-pressed ball 36 is cooperative are so positioned that the disk 34 is releasably held to retain any selected color filter in its proper projecting position.

Referring to Figs. 10, 11 and 12, the aforesaid tracks 1, 1 are shown as supporting a frame formed from longitudinally extending members 45 disposed in parallel relation and transverse members 46 likewise disposed in parallel relation, these members 45 and 46 being suitably secured to each other in frame-forming relation so as to form a movable base for a carriage C utilizable as hereinafter described. The rear member 46, at each end thereof, has secured thereto in suitable manner a bearing structure 47, these bearing structures 47 being alined transversely and each of them supporting a horizontal stud on which a roller 48 is freely rotatable. The front member 46, at each end thereof, has secured thereto in suitable manner a bearing structure 49, these bearing structures 49 being transversely alined and each of them supporting a horizontal stud on which a roller 50 is freely rotatable.

Disposed in front of the carriage C is a platform formed, in the example shown, from a pair of transversely extending members 51 suitably bolted together, one end of this platform being supported by the bearing structures 49 preferably in pivotal fashion as indicated at 52. Secured to each front corner of the aforesaid platform is a bearing structure 53, these bearing structures 53 being transversely alined and each of them supporting a horizontal stud on which a roller 54 is freely rotatable.

In view of the foregoing description, it will be understood that one set of rollers 48, 50 and 54 engage one of the tracks 1 whereas the other set of rollers 48, 50 and 54 engage the other track 1. As indicated in Fig. 10, the set of rollers at the left engage the adjacent track 1 in non-grooved relation whereas the set of rollers at the right are grooved for the reception of the adjacent track 12.

Preferably, in accordance with the invention, the longitudinally extending members 45 have bolted or otherwise secured thereto one or more transversely extending platform-forming members 55.

Upstanding from and secured to the aforesaid movable base for the carriage C are a pair of vertical members or standards 56, such as angle irons, these standards 56 being braced by the inclined and horizontal members 57.

As shown in Figs. 10, 11, 12 and 23, one of the aforesaid standards 56 carries a horizontally extending bracket 58 in which is journalled a shaft 59 having an operating hand wheel 60 at one end thereof. Suitably secured to the other end of the shaft 59 is a sprocket wheel 61 disposed in the same vertical plane as an idler sprocket wheel 62 and a driven sprocket wheel 63. The sprocket wheel 62 is journalled on a stub shaft 64 carried by a bracket 65 secured to the adjacent standard 56. The sprocket wheel 63 is secured to a horizontal shaft 66 journalled in bearing brackets 67 secured to and depending from that transverse member 46 which is disposed at the front of the movable base for the carriage C. Carried by the sprocket wheels 61, 62 and 63 is an endless sprocket chain 68 serving to transmit power generated at the hand wheel 60 to the driven sprocket wheel 63.

Adjacent each of its ends, the shaft 66 has secured thereto a gear wheel 69, these gear wheels being disposed immediately above and in meshing relation with the respective racks 6. As shown in Fig. 12, it is desirable for each of the bearing brackets 67 to have an angle member 70 secured thereto in suitable manner, these angle members 70 engaging the bottom surfaces of the respective racks 6 to thereby maintain the gear wheels 69 in proper meshing relation with the respective racks 6.

As shown in Fig. 12, the bearing bracket 67 toward the right, Fig. 10, is provided with a vertical passage extending upwardly from the shaft 66 for the reception of the reduced lower end of a rod 71 which extends vertically to approximately the height of the hand wheel 60 and there terminates in an actuating wheel 72, the rod 71 being threaded in suitable manner to some fixed part of the mechanism, for example, to a nut 73 carried by the adjacent horizontal bracing member 57.

With the rod 71 elevated to such extent that the lower end thereof is above the shaft 66, it will be understood that an operator may rotate the hand wheel 60 to thereby transmit rotary movement to the sprocket wheel 63, through the mechanical connection comprising the shaft 59, the sprocket wheel 61 and the sprocket chain 68. As a result, rotatable movement of the shaft 66 and gear wheels 69 is produced. The gear wheels mesh with the respective racks 6 and, therefore, responsive to movement of said hand wheel 60, the carriage C is moved in one direction or another along the tracks 1, 1. In case it becomes desirable to positively retain the carriage C in any selected position to which it has been moved, the rod 71 may be rotated to move the reduced end thereof into locking engagement with the shaft 66 and thereby prevent translatory movement of the carriage C.

Referring to Figs. 10, 11, 20 and 21, one standard 56 is shown as carrying a bracket 74 terminating in a tubular bearing 75 which supports outer and inner sleeves 76, 77 together with an inner shaft 78, said sleeves and shaft being independently movable with respect to each other on needle bearings as shown in Fig. 20. Operatively associated with the sleeves 76, 77 and shaft 78 at one end thereof are the respective actuating wheels or members 79, 80 and 81. At their other ends, the sleeves 76, 77 and shaft 78 carry the respective sprocket wheels 82, 83 and 84.

Referring particularly to Figs. 10, 21 and 22, the aforesaid bearing 75 is shown as having a pair of spaced rods 85, 86 projecting longitudinally therefrom. A ring 87 comprises a slot which receives the rod 85, Fig. 22, and rings 88, 89 comprise slots which, respectively, receive the rod 86, Fig. 21, these rings 87, 88 and 89 being loosely carried by the hubs of the respective sprocket wheels 83, 84 and 82, Figs. 20 and 21. Each of said rings comprises a boss 90 through which is threaded a screw 91, the screws 91 being adapted to be moved into binding relation as regards the hubs of said respective sprocket wheels.

The sprocket wheels 82, 83 and 84 have associated therewith the respective endless sprocket chains 94, 95 and 96, Figs. 10 and 11, which engage idler sprocket wheels 94a, 95a and 96a, respectively, the sprocket wheels last noted being mounted on the upper surface of one of the hereinbefore described members 46. Secured to the lower surface of said member 46 is a bracket 97, Figs. 10 and 24, which comprises three bearings 94b, 95b and 96b, Fig. 24, disposed at the same horizontal level. Freely rotatable in the aforesaid bearings are the respective bushings 94c, 95c and 96c having secured thereto the sprocket wheels 94d, 95d and 96d, respectively. Openings are provided in the member 46 for the free passage therethrough of both spans of each of the aforesaid sprocket chains 94, 95, and 96 which coact, respectively, with the driven sprocket wheels 94d, 95d and 96d, Fig. 24. The operation of the mechanism referred to above will be subsequently described.

Referring to Fig. 9, each of the hereinbefore described standards 56 of the carriage C is shown as having secured thereto a plurality of angle members 100, Fig. 7, which are secured in suitable manner to a suction housing 101 comprising rear and front walls 102 and 103, top and bottom walls 104 and 105 together with side walls 106, Figs. 7, 8a, 8b, 9, 10 and 11, the aforesaid angle members 100 being secured to said rear wall 102.

The suction housing 101 is braced by a plurality of spaced vertical members 107 and a plurality of spaced horizontal members 108, the outermost members 108, Fig. 7, terminating short of the respective housing side walls 106 and the respective members 107 closest thereto, the inner members 108 terminating short of the respective members 107.

As shown in Fig. 7, the two central members 107 terminate equal distances above and below the central horizontal plane of the housing 101. Horizontal upper and lower members 109 and 110 are disposed flushly against the respective upper and lower sections of the two central members 107, the members 109 and 110 extending beyond the two central members 107 and engaging those members 107 which are disposed at the opposite, respective sides of said central members 107. As also shown in Fig. 7, the upper and lower members 109 and 110 are braced by vertical members 111 and 112 disposed, respectively, at equal distances from the central vertical plane of the housing 101.

It will be understood that the members 107, 108, 109, 110, 111 and 112 are suitably secured, as by screws 101a, in right-angular relation to the rear and front housing walls 102, 103 and that they span the space defined thereby. As indicated in Figs. 7 and 9, the members 109, 110, 111 and 112 are provided with openings 113. Further, as regards those vertical members 107 which engage the members 109 and 110, the sections thereof between said members 109 and 110 are provided with similar openings 113, all of these openings 113 being utilizable as hereafter described.

Referring to Figs. 7 and 9, the rear housing wall 102 is shown as comprising an aperture 114 which receives a door 115 hinged to said wall 102 at 116 and 116, the door 115 being maintained in the plane of the wall 102 by suitable latch mechanism 117, Fig. 7. Suitably secured to the door 115 is the flanged end of a nozzle 118 to which is connected a hose leading to any suitable vacuum pump, not shown. Disposed interiorly of the nozzle 118 is a damper or control valve 119 having an operating shank to which is operatively related, in detachable manner, a rod 120 slidable in a bearing 121 secured to the rear housing wall 102.

In accordance with the invention, the front housing wall 103 is shown as comprising an aperture 122 corresponding generally and alined with the aforesaid aperture of the rear housing wall 102. Seated in a flanged surface of the wall 103 is a member 125 on which images may be focused. The member 125 may be a sheet of ground glass although, preferably, it is a sheet of Vinylite. As herein shown, the peripheral portion of the member 125 is provided with a plurality of spaced apertures through which extend the respective screws 126 utilizable for holding said member 125 in the plane of the wall 103.

As indicated in Fig. 7, the front wall 103 of the suction housing 101 together with the member 125 are provided with closely spaced apertures which open from the atmosphere into the interior of said housing 101.

Referring to Figs. 7 and 8a, the aforesaid top wall 104 of the housing 101, at each end thereof, has the horizontal arm of a T-member 127 secured thereto in suitable manner. The vertical arm of each angle member 127 is provided with an upwardly-opening vertical slot and these slots are alined horizontally for the reception, respectively, of a locked pin and a rotating pin which extend axially from opposite respective ends of a horizontal roller 128 upon which is wound a horizontal curtain 129 adapted to engage an idler roller 128a, this pin and roller arrangement together with the supports therefor corresponding generally with the usual window shade construction of similar nature.

As indicated in Fig. 7, the bottom wall 105 of the housing 101 carries a pin arrangement, horizontal roller and horizontal curtain arrangement of the character described above. To parts of the lower curtain arrangement which correspond with the respective parts of the upper curtain arrangement, duplicate reference characters have been applied, respectively.

Referring to Figs. 7 and 8b, each side wall 106, at the upper and lower ends thereof, has a T-member 132 secured thereto, these T-members being vertically and horizontally alined in pairs and each pair of said T-members 132 having a horizontal track 133 secured thereto in suitable manner. As shown in Fig. 8a, the T-member 132 comprises a horizontal arm 134 which carries a vertical stud 135 engaged, at its lower section, with the top wall 104. As indicated in Figs. 8a and 8b, the end of the arm 134 terminates in a bearing support.

It will be understood that a T-member 132 is disposed and mounted as described above at each corner of the suction housing 101. The arms 134 are alined in vertical pairs adjacent each side wall 106 and each pair of vertically alined arms 134 supports the respective ends of a vertical roller 136 having a vertical curtain 137 wound thereon, the roller and curtain arrangement corresponding generally with that hereinbefore described with reference to the rollers 128 and curtains 129.

In view of the foregoing description, it will be understood that horizontal tracks 133 are disposed at and along the respective upper and lower ends of the suction housing 101. Each of these tracks 133 carries a rack bar 138 with which meshes a pinion 139 mounted in the manner hereinafter described. Coactable with each of the tracks 133 are a pair of slides 140 and these are alined vertically in pairs. As shown particularly in Fig. 7, each pair of the vertically alined slides 140 are connected together by a vertical rod 141 and a vertical shaft 142, the upper and lower pinions 139 of each set of pinions being secured to the respective shafts 142.

As shown in Figs. 8 and 8a, each of the rods 141 has a plurality of straps 143 secured thereto. At each side of the housing 101, each set of straps 143 projects toward and forms bearings for the adjacent shaft 142. For each shaft 142, one of the straps 143 is threaded for the reception of a headed screw 144 which may be moved into engagement with or released from the adjacent shaft 142 for a purpose hereinafter to be described.

Each of the vertical curtains 137 hereinbefore described passes over an idler roller 136a, Fig. 8b, and each curtain 137 is suitably attached, at the respective corners thereof, to the adjacent upper and lower slides 140.

Referring to Figs. 1, 2, 15 and 16, the aforesaid tracks 1, 1 are shown as supporting a frame formed from longitudinally extending members 150 disposed in parallel relation and transverse members 151 likewise disposed in parallel relation, these members 150 and 151 being suitably secured to each other in frame-forming relation so as to form a movable base for a carriage C1 utilizable as hereinafter described. Secured to each corner of the frame formed by the aforesaid longitudinal and transverse members 150 and 151 is a bearing structure 152, these bearing structures being alined longitudinally and transversely in pairs. Each bearing structure 152 supports an outwardly extending horizontal stud and each stud freely supports a roller 153. As shown in Fig. 1, the pair of rollers 153 at the right engage the adjacent track 1 in grooved relation whereas the pair of rollers 153 at the left engage the adjacent track 1 in non-grooved relation.

Upstanding from and secured to the aforesaid base for the carriage C1 are a pair of vertical members or standards 154, such as angle irons, these standards 154 being braced by the inclined and horizontal members 155. Secured to each of the upper horizontal members 155 is a bearing block 156, the respective bearings in these blocks being horizontally alined.

Secured to the respective inclined members 155 are the horizontally extending rods 157 which are transversely braced by a horizontal member 158. Extending vertically from the rods 157 and the member 158 are the members 159 which are transversely braced by a member 160 to thereby support a curtain reflector 161 utilizable as hereinafter described. The rods 157, the member 158 and the members 159 are connected together by lower brackets 158a, Fig. 1, which are adjustably mounted on the rods 157.

Referring to Figs. 1, 2, 26 and 27, I have shown an open frame 162 of oblong, rectangular configuration, this frame 162 being braced by the upper and lower members 163 together with the intermediate members 164, Fig. 1. Secured to the intermediate members 164 are the parallel members 165 provided, respectively, with trunnions 166 disposed in horizontal alinement, said trunnions 166 being received, respectively, in the aforesaid bearings formed in the respective blocks 156.

As will be understood, the frame 162 is adapted for pivotal movement in the trunnion bearings described above and, during such pivotal movement, the frame 162 together with the parts carried thereby are moved counter-clockwise, Fig. 1, from vertical to horizontal position, Fig. 2, and vice versa. For cushioning purposes, suitable shock-absorbing mechanism may be provided to decrease the rate of movement of said frame 162 as it approaches either horizontal or vertical position.

To this end and as shown in Fig. 1, the spring-containing ends of a pair of airplane-type shock absorber 167 are pivoted to the upper ends of the respective members 165. The stop-carrying members 167a of the respective shock absorbers 167 extend freely through passages provided therefor, respectively, in a horizontal member 168 suitably secured to the lower horizontal members 155 of the carriage C1. When the frame 162 is moved counter-clockwise from the position shown in Fig. 1, the members 167a move therewith until the stops carried, respectively, thereby engage the member 168 whereupon relative movement of each spring-containing end of each shock absorber occurs with respect to each stop-carrying member thereof. This causes movement of said frame 162 to be decelerated as it approaches its horizontal position.

Further, for shock-absorbing purposes, a pair of shock absorbers 169 are horizontally secured in suitable manner to the lower part of the carriage C1, the respective, spring-controlled movable elements thereof projecting forwardly beyond said carriage. When the frame 162 is moved from horizontal to vertical position, the lower part thereof engages these movable elements and moves them against spring pressure to their retracted positions whereby movement of said frame 162 is decelerated as it approaches its vertical position.

Referring particularly to Figs. 1, 26 and 27, the hereinbefore described open frame 162 of oblong, rectangular configuration is shown as having angle configuration when viewed in section. Coactable with the frame 162 is a similar open frame 170 and these two frames are pivoted together at 171. The lower surface of the frame 170, Fig. 27, has pocket-forming members 172 secured thereto which support a transparent plate 173 such, for example, as a sheet of glass, the plate 173, then, closing the opening defined by the frame 170.

The inner edge of the frame 162, throughout the periphery thereof, supports a plurality of spaced sleeves 174 which, in freely slidable relation, receive the respective members 175. Each of the hereinbefore described parallel members 165 supports a plurality of spaced sleeves 176 which, in freely slidable relation, receive the respective members 177. Secured to the upper ends of the members 175 and 177, Fig. 27, is a plate 178 and below this plate, each of the members 175 and 177 carries a helical spring 179 whereby said plate 178 is biased in an upward direction, Fig. 27.

The plate 178, between the pairs of members 164 and 165, is provided with an aperture 180 having oblong, rectangular configuration, this aperture, at opposite sides thereof, being bordered by a pair of parallel members 181, Fig. 30, secured in suitable manner to the surfaces of said plate 178. Carried by the members 181 are the respective track members 182 which carry upper and lower supporting bars 183 and 184, the bar 183 being spring-controlled so that it remains in a desired position and the bar 184 being provided with spring-controlled latching members 185 adapted to be releasably associated with serrations formed in the members 182 whereby said bar 184 may be positively retained in a desired position. Secured to the bars 183 and 184 are the respective strips 186 which overhang the facing surfaces of said bars 183 and 184 as indicated in Fig. 29.

In accordance with the invention, the aforesaid aperture 180 of the plate 178 is adapted to be closed by a filler plate 187 which may be reinforced on its rear surface by a plurality of angle irons 187a. One pair of opposite sides of the filler plate 187 has the strips 188 secured thereto, respectively, while the other pair of opposite sides of said filler plate 187 has the angle irons 189 secured thereto, respectively.

With the bars 183, 184 in their respective upper and lower positions as indicated in Fig. 29, the filler plate 187 is adapted to be disposed in and close the aforesaid aperture 180. When thus positioned, the strips 188 of the filler plate 187 rest on the respective track members 182 and the filler plate angle irons 189 rest on the respective strips 186. When thus positioned, the outer surface of the filler plate 187 is flush with the outer surface of the plate 178.

With the filler plate 187 positioned in the aperture 180 as described above, a mat 190 formed from rubber, or equivalent, and preferably conforming in configuration with the plate 178 may be positioned on the latter as indicated in Fig. 27. Secured to the mat 190, at the periphery thereof, is an endless sealing strip 191 formed from rubber, or equivalent, with which the hereinbefore described plate 173 is adapted to coact, when the frame 170 is in closed position, Fig. 27, to form a closed chamber within said endless sealing strip 191.

In order to cushion movement of the frame 170 as it is moved from open to closed position and vice versa, links 192 and 193 are pivoted to the respective frames 162 and 170 on the respective pivots 192a and 193a, two sets of the links 192 and 193 being provided as indicated in Fig. 2.

In order to cushion movement of the frame 170 as it is moved from open to closed position and vice versa, links 192 and 193 are pivoted to the respective frames 162 and 170 on the respective pivots 192a and 193a, two sets of the links 192 and 193 being provided as indicated in Fig. 2. Each of these links is offset near its free end and, between these offset ends, there is disposed one end of a helical spring 194, these parts being secured together by a headed pin 195 and a cotter pin 196 and the other end of said spring 194 being secured to the frame 162 as indicated in Fig. 2.

As shown in Figs. 1, 15, 16, 17, 18 and 19, one of the aforesaid standards 154 carries a horizontally extending bracket 200 in which is journalled a shaft 201 having an operating hand wheel 202 at one end thereof. Suitably secured to the other end of the shaft 201 is a sprocket wheel 203 disposed in the same vertical plane as a sprocket wheel 204 secured to a horizontal shaft 205 journalled in bearing brackets 206 secured to and depending from the forward transverse member 151 of the base for the carriage C1. Carried by the sprocket wheels 203 and 204 is an endless sprocket chain 207 serving to transmit power generated at the hand wheel 202 to the driven sprocket wheel 204, the sprocket chain 207 extending through suitable apertures provided therefor in the member 151, Fig. 17.

Adjacent each of its ends, the shaft 205 has secured thereto a gear wheel 208, these gear wheels being disposed immediately above and in meshing relation with the respective racks 6. As indicated in Fig. 19, it is desirable for each of the bearing brackets 206 to have an angle member 209 secured thereto in suitable manner, these angle members 209 engaging the bottom surfaces of the respective racks 6 to thereby maintain the gear wheels 208 in proper meshing relation with said racks 6, respectively.

As shown in Fig. 19, the bearing bracket 206 toward the right is provided with a vertical passage extending upwardly from the shaft 205 for the reception of the reduced lower end of a rod 210 which extends vertically to approximately the height of the hand wheel 202, Fig. 16, and there terminates in an actuating hand wheel 211, the rod 210 being threaded in suitable manner to a nut carried by one of the lower bracing members 155 of the carriage C1.

With the rod 210 elevated to such extent that the lower end thereof is removed from the shaft 205, it will be understood that said shaft 205 is free for rotary movement and that an operator may rotate the hand wheel 202 to thereby transmit rotary movement to the sprocket wheel 204 through the described mechanical connection whereby the carriage C1 is moved in one direction or another along the tracks 1, 1. In case it becomes desirable to positively retain the carriage C1 in any selected position to which it has been moved, the rod 210 may be rotated to move the reduced end thereof into locking engagement with the shaft 205 and thereby prevent translatory movement of the carriage C1.

Referring particularly to Fig. 24, I have shown two brackets 215, 216 which are disposed between the tracks 1, 1 and are anchored in fixed position in any suitable manner, as by attachment to said tracks 1, 1. The bracket 215 is disposed immediately adjacent the ends of the tracks 1, 1 toward the right, Fig. 1, whereas the bracket 216 is disposed at or adjacent the lower ends of the hereinbefore described standards 8. Each of the brackets 215 and 216 comprises three bearings which are alined longitudinally in pairs. One set of alined bearings supports a horizontal shaft 217 having a gear wheel 218 secured to the end thereof toward the right, Fig. 24. Another set of alined bearings supports a horizontal shaft 219 having a bevel gear 220 secured to the end thereof toward the right, Fig. 24. The third set of alined bearings supports a horizontal shaft 221 having a sleeve 222 secured to the end thereof toward the right, Fig. 24. The shafts 217, 219 and 221 extend through the hereinbefore described bushings 96c, 95c and 94c, respectively, each of said shafts being polygonal in cross-section and the interior passage of each of said bushings being of similar polygonal configuration in cross-section. Therefore, as will be understood, the bushings 96c, 95c and 94c move as a unit, when the carriage C is moved relative to the respective shafts 217, 219, 221, while maintaining a driving relation with respect to all of said shafts.

Referring to Fig. 3, the above described gear wheel 218 is shown as meshing with a gear wheel 223 secured to a horizontal shaft 224 journalled in bearings secured to the hereinbefore described plate 11, opposite ends of this shaft 224 being connected in geared relation to the respective vertical shafts 225 and 226 journalled in bearings carried by said plate 11 and the frame plate 16. The upper ends of the shafts 225 and 226 are threaded so that they coact, respectively, with nut members 227 and 228 secured to the hereinbefore described frame plate 18.

Referring further to Fig. 3, the above described bevel gear 220 is shown as meshing with a bevel gear 229 carried by the lower end of a vertical shaft 230 journalled in bearings carried by the plates 11 and 20. At its upper end, the shaft 230 carries a gear wheel 231 which meshes with a rack 232 horizontally disposed on said plate 20.

Referring to Fig. 24, one end of a shaft 233 is shown as secured to the above described sleeve 222, the other end of said shaft 233 being journalled in a suitably anchored bearing 234 disposed between the tracks 1, 1 immediately adjacent the end of the camera toward the left, Fig. 1.

As shown in Fig. 15, the transverse member 151 of the base for the carriage C1 has depending therefrom a bracket which terminates in a bearing member 235. Coactable with this bearing member 235 is a half nut 236 carried by one end of an inclined rod 237, the upper end of said rod 237 carrying an operating lever 238. In accordance with the invention, the threaded section of the shaft 233 extends between the bearing member 235 and the half nut 236 when the half nut 236 is in engagement with the shaft 233, it will be understood that rotation of said shaft 233, produced in the manner hereinafter described, serves to impart translatory movement to the carriage C1. In order to break this driving connection, the lever 238 is operated against its cam surface, Fig. 2, to move the half nut 236 from engagement with the shaft 233. When this has been done, the carriage C1 may be moved in either direction along the tracks 1, 1 by operation of the hereinbefore described hand wheel 202.

Referring to Figs. 13 and 14, I have shown a housing 240 formed from two parallel plates 241 and 242 integrally joined together at one side and connected together at their other sides by a closure member 243. Journalled in these plates near the top thereof is a shaft 244 which, exteriorly of said housing 240, has secured thereto an indicating disk 245, an operating hand wheel 246 and a gear wheel 247, the latter meshing with a suitably supported idler gear wheel 248 operative to drive a gear wheel 249 utilizable for actuating suitable counter mechanism 250.

Interiorly of the aforesaid housing, the shaft 244 carries a gear wheel 251 which meshes with a gear wheel 252 carried by a shaft which also carries a gear wheel 253. The latter meshes with a gear wheel 254 carried by a shaft which also carriess a gear wheel 255. The latter meshes with a gear wheel 256 carried by a shaft which extends exteriorly of said housing 240 where it carries a coupling sleeve 257.

Referring to Figs. 1, 2 and 14, the hereinbefore described housing 240 is shown as secured by bolt and sleeve devices 258 to one of the longitudinal members 156 of the base for the carriage C1. The above noted sleeve 257 is connected to a suitably journalled shaft 259 extending transversely above the tracks 1, 1 and carrying the gear wheels 260 which mesh with the respective racks 6.

It will be understood that the base for the carriage C may have associated therewith duplicate vernier mechanism of the character described above, such mechanism being operatively related to the racks 6 in the manner indicated.

As indicated in Fig. 4 one wall W of the camera dark room is apertured to receive a frame 261 in which the upper edge of the aforesaid shield plate 13 is received preferably in non-contacting relation so as to avoid the transmission of vibrations thereto. As will be understood, the hereinbefore described suction housing 101 and parts associated therewith are housed in this camera dark room.

During operation of the hereinbefore described vacuum pump, air is continuously exhausted from the suction housing 101. In so doing, the air passes around the horizontal members 108 and through the openings 113 formed in the members 107, 109, 110, 111 and 112, the air finally reaching the chamber bounded by the members 109, 110, 111 and 112 from which such air is exhausted through the described hose connection.

After the light-sensitive member which is to be associated with the front wall 103 of the suction housing 101 has been selected and, knowing the dimensions thereof, the operator observes horizontal and vertical scales, Fig. 1, which are formed on the front housing wall 103 to thereby determine the extent to which the curtains 129 and 137 are to be opened. When opening the horizontal curtains 129, they are drawn toward each other to the desired extent. As shown in Figs. 8a and 8b, each corner of each horizontal curtain carries a pin and, after each horizontal curtain has been properly positioned, these pins are passed into openings formed in the opposite vertical sides of the housing wall 103, these openings being spaced close to each other for the intended purpose. In this manner, said horizontal curtains 129 are caused to remain in their intended positions.

Thereupon, each assembly comprising a pair of vertically alined slides 140, a vertical rod 141 and a vertical shaft 142 is moved toward the central vertical plane of the housing 101 to the desired extent whereby each of the vertical curtains 137 is unwound to the amount desired. This movement of the slides 120 occurs along the respective tracks 133. During such slide movement, the pinions 139 at the respective ends of each shaft 142 rotate, in meshing relation, with the respective rack bars 138 and, as will be understood, an arrangement of this character positively causes the two slides 141 of each assembly to remain in vertical alinement. After completion of the operation last described, each of the screws 144 may be threaded into engagement with its cooperating shaft 142 to thereby positively retain each vertical curtain 137 in the position to which adjusted.

After completion of the operation described above, there remains an exposed area of the front housing wall 103 having dimensions corresponding with the dimensions of the selected light-sensitive member. All other parts of said wall 103 are covered by the described curtains.

With the vacuum pump operating and with the curtains 129 and 137 together with the described light-sensitive member covering the entire area of the housing wall 103, it results that all of the apertures extending therethrough and through the member 125 are sealed either by the curtains or by said light-sensitive member. As a result, said light-sensitive member is effectively held in position on the wall 103 by action of suction.

The curtain arrangement described above constitutes an important feature of the invention. It will be understood that the described curtains are readily adjustable to numerous positions in order to accommodate light-sensitive members of different sizes. For each adjusted position, the curtains serve in the intended manner to seal those apertures last named which are not covered by the light-sensitive member.

The hereinbefore described platform which is formed by the members 51 is provided so that the operator may stand thereon during the above described operations involving movement of the curtains 129 and 137 to their adjusted positions and disposition of the light-sensitive member in its selected position.

When the vacuum pump was operated as described above to exhaust air from the suction housing 101, the rod 120, Fig. 9, was in such position that the damper 119 is in its non-obstructing position. The rod 120 may be rotated to thereby move the damper 119 to a position wherein it closes the passage in the nozzle 118 and, at this time, even though operation of the vacuum pump continues, there is no suction effect in the housing 101. The provision of the damper 119, then, is advantageous because providing means for temporarily discontinuing the suction effect in said housing 101 even though operation of the vacuum pump continues.

If the image on the light-sensitive member is to be obtained from copy illuminated by reflection, the operator positions the frame 162 horizontally and moves the frame 170 to its open position as shown in Fig. 2. For reflecting projection, the mat 190 is disposed on the plate 178 as shown in Fig. 27 and, upon this mat, the operator places the copy from which the image is to be obtained. Thereupon, the frame 170 is moved to its closed position and engaged by the latches shown in Fig. 2, this action causing the transparent plate 173 to engage the sealing strip 191 against the force of the biasing springs 179, Fig. 27, and form a sealed chamber within which the copy is enclosed. A conduit 178a communicates with this sealed chamber and is connected to a vacuum pump, not shown, so that said chamber may be exhausted in order to cause the copy to intimately engage the transparent plate 173. Thereupon, the frames 162 and 170 are swung to the vertical position shown in Fig. 1 to thereby cause the exposed face of the copy to assume a vertical position wherein it faces the vertically positioned light-sensitive member on the front wall of the suction housing 101.

As hereinbefore described, the slide 22, Figs. 3 and 4, supports a horizontal row of objective lenses having different focal lengths, respectively. By manual movement of the slide 22 under the control of its actuating handle, said slide 22 is moved horizontally to position the desired objective lens substantially in its intended position where it is retained by the spring-pressed plunger 30.

After completion of the foregoing, the focusing operation should be proceeded with. While this operation proceeds, the above described light-sensitive member should not be attached to the suction housing 101. In lieu thereof, for focusing purposes, a sheet of white paper should be suitably attached to said suction housing 101 in the space which, subsequently, is to be occupied by the light-sensitive member. At this time, the copy supported in the frames 162 and 170 as described above should be illuminated by a plurality of lamps, not shown, as known in the art. Thereupon, the operator in the dark room, provided that the half nut 236 is in engagement with the threaded section of the shaft 233, Fig. 15, rotates the hand wheel 60, Figs. 10 and 11, and the hand wheel 79, Fig. 20, to thereby move the respective carriages C and C1 with respect to each other and with respect to the objective lens which was disposed in the projecting position as described above.

As will be understood in view of the foregoing description, rotation of the hand wheel 60 causes movement, through the mechanical connection comprising the shaft 59, the sprocket wheel 61 and the sprocket chain 68, of the carriage C along the tracks 1, 1. Rotation of the hand wheel 79, Fig. 20, produces rotation of the sprocket wheel 82 to actuate the sprocket chain 94 and rotate the sprocket wheel 94d, Fig. 24, whereby the shafts 221 and 233 are rotated, the shaft 233 coacting with the nut member 236 to effect movement of the carriage C1. As will be understood, rotary movement applied to the hand wheels 60 and 79 is continued in one direction or the other until the image projected on the focusing paper sheet, as viewed by the dark room operator standing in front thereof, is properly focused and has the desired dimensions. Thereupon, the carriages C and C1 may be locked in the respective positions thereof thus selected by effecting engagement of the rods 71 and 210 with the respective shafts 66 and 205.

It will be understood that movement of the carriage C1, when effected in the manner described above, necessarily is of the "slow" type. Therefore, should the desired focusing operation require substantial movement of said carriage C1 the operator outside of the dark room may actuate the operating lever 238, Fig. 15, to thereby withdraw the half nut 236 from engagement with the shaft 233. When this has been done, the outside operator may rotate the hand wheel 202 to thereby transmit rotary movement, through the described mechanical connection to the gear wheels 208 whereby the carriage C1 is moved in the desired direction along the tracks 1, 1. By this operation, said carriage C1 is moved approximately to its proper position whereupon the outside operator actuates the lever 238 to return the half nut 236 to its engaging position with the shaft 233.

After completion of the operations described above, the operator in the dark room centralizes the image on the aforesaid white paper sheet by suitably operating the hand wheel 80 and the lever 81, Fig. 20. When the hand wheel 80 is rotated, the sprocket wheel 83 actuates the sprocket chain 95, Fig. 11, to thereby rotate the sprocket wheel 95d and shaft 219, Fig. 24. As a result, through the mechanical connection comprising the bevel gears 220 and 229, Figs. 24 and 3, the vertical shaft 230 is rotated in one direction or another to thereby impart horizontal movement to the plate 20 and the thereby-carried slide 22 for the objective lens.

When the lever 81, Fig. 20, is rotated, the sprocket wheel 88 actuates the sprocket chain 96, Fig. 11, to thereby rotate the sprocket wheel 95d and shaft 217, Fig. 24. As a result, through the mechanical connection comprising the gear wheels 218 and 223, Figs. 24 and 3, the vertical shafts 225 and 226 are rotated in unison and in the same direction to thereby impart vertical movement to the frame plate 18 and the thereby-carried plate 20 and slide 22 for the objective lens.

After completion of the above noted focusing operations and referring to Figs. 10, 21 and 22, each of the hereinbefore described screws 91 should be moved into binding relation with the respective rings 89, 87 and 88 in order to positively prevent unintended movement of the carriage C1 and the objective lens, either horizontally or vertically, from their respective positions which were selected as described above.

During the operations described above, the hereinbefore described sleeve arm 32b should be in its non-operative position toward the left, Fig. 3. After completion of the focusing and other operations described above, said sleeve arm 32b should be returned to its position as shown in Fig. 3 whereupon the disk 34 may be rotated to a desired position in order to bring a selected color filter F into the axis of the projecting light beam.

A feature of distinct importance in connection with the present invention involves the suction housing arrangement comprising the door 105 and focusing member 125. It was explained above that the operator in the dark room stands in front of the carriage C in order to observe the image projected onto the focusing paper sheet. Alternatively, without using said focusing paper sheet, the rod 120, Fig. 9, may be moved to its retracted position whereupon the latch mechanism 117 may be actuated to open the door 102. After this has been done, the operator in the dark room stands upon the rear platform formed by the members 55, Fig. 12, so as to directly observe the focusing member 125 from the rear in order to ascertain the character of the image projected thereon.

The invention has hereinbefore been described in connection with reflecting projection. Alternatively, if desired, the projection may be of the "through" type and, if so, the frames 162 and 170 are moved to the horizontal position thereof shown in Fig. 2 whereupon the frame 170 is opened so that the blanket 190 and the filler plate 187 may be removed. Thereupon, the bars 183 and 184 are moved to a selected position in order to form a support for a frame 265 carrying a transparent or translucent representation-bearing member 266 such, for example, as positive copy, Fig. 1. Then, with the frame 170 in its closed position and the two frames 162 and 170 in vertical position as shown in Fig. 1, a light beam is passed through the representation-bearing member 266, thence through the objective lens and into engagement either with the focusing paper sheet which was secured to the suction housing 101 or the member 125. Thereupon, in the manner hereinbefore described, the operator proceeds with the focusing and centering operations of the projected image.

In the form of the invention herein shown, although not necessarily, the curtain 161, Figs. 1, 15 and 16, is lowered and illuminated by a plurality of lamps, not shown, placed in front thereof, whereby said curtain 161 reflects a beam of light for passage through the representation-bearing member 266 as described above.

After completion of the operations described above, the camera is in condition for the photographing operation. With the vacuum pump operating, the dark room operator removes the above described focusing paper sheet, if utilized, from the lens housing 101 and places the light-sensitive member in this space. While the representation-bearing member 266 is supported as described above (for "through" projection) or while the copy is disposed in the frames 162 and 170 (for "reflecting" projection) and during proper illumination thereof, the exposure of the light-sensitive member is completed in the usual manner as will be understood by those skilled in the art.

As hereinbefore described, the carriage C has attached thereto the bracket 97 shown in Figs. 10 and 24. In effect, the bushings 94c, 95c and 96c which are carried by said bracket 97 are splined to the respective shafts 221, 219 and 217. Therefore, during movement of the carriage C in either direction, the bracket 97 moves therewith and with respect to said shafts last named while maintaining a driving connection with respect to them.

It was hereinbefore pointed out that each of the carriages C and C1 may have a vernier mechanism associated therewith. This mechanism is useful, particularly when effecting the final fine adjustment since, at that time, the operator may actuate the wheel 246 to thereby move the associated carriage at "slow" speed. It shall be understood, however, that my invention is not to be limited to the use of these vernier mechanisms since, as will be obvious, they may be dispensed with if desired.

Although the curtain-masking arrangement and the arrangement comprising the focusing member 125 and the door 102 have been illustrated and described as forming part of a suction housing which is included in a camera, it shall be understood that the invention is not to be thus limited. Obviously, these arrangements may be used in projection systems other than cameras.

In view of the foregoing explanation, it will be understood that the various controls are localized on the carriage C. This carriage is in the camera dark room and conveniently located thereon are the various actuating members for moving said carriage C itself, for moving the carriage C1 and for effecting vertical and horizontal movement of the objective lens. This is an advantageous arrangement because it places the various controls in the dark room and on the carriage which carries the light-sensitive member.

The arrangement comprising the frames 162 and 170 is of distinct importance. It has previously been explained that copy may be mounted on the blanket 190. Alternatively, this blanket 190 and the filler plate 187 may be removed so that a representation-bearing member 266 may be mounted on the bars 183 and 184, Fig. 1, which are carried by the plate 178. Further, the blanket 190 may be removed and, with the filler plate 187 in position, the copy, for reflecting projection, may be mounted on said filler plate 187 and the plate 178. With any one of these arrangements, the springs 179 acting through the plate 178, serve to hold the copy, during the projecting operation, against the transparent member 113, the latter, then, acting as a positioning and compensating member.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a device of the character described, supporting means, a frame plate movable on said supporting means, a slide horizontally movable on said frame plate, a plurality of objective lenses fixed in a horizontal row on said slide, a bracket secured to said frame plate, a disk rotatably mounted on said bracket for movement in a vertical plane, and a plurality of color screens carried by said disk.

2. In a device of the character described, a supporting plate, a frame plate carried by and horizontally movable with respect to said supporting plate, a slide horizontally movable on said frame plate, a plurality of objective lenses carried by said slide, a bracket secured to said frame plate, and a color screen carried by said bracket.

3. In a camera of the character described the combination of an objective lens support, a frame carried by and horizontally movable with respect to said support, a slide horizontally movable on said frame, a plurality of objective lenses carried by said slide for selective individual register with the photographic axis of said camera, a bracket arm pivotally secured to and movable with and with respect to said frame, the pivot axis of said bracket extending in a direction normal to and being disposed in offset relation to said photographic axis, a disk rotatably mounted on the outer end of said bracket arm, and a plurality of color screens carried by said disk and rotatably movable therewith into selective individual register with said photographic axis and simultaneously movable as a group with said arm about its pivot axis out of the optical path of said camera.

4. In a camera of the character described the combination of a support for holding an objective lens relatively fixed in the direction of its axis, a plurality of frames carried by said support, one of said frames being movable vertically with respect to said support and another of said frames being movable horizontally with respect to said support, a slide horizontally movable on one of said frames, a plurality of objective lenses disposed in a horizontal row on said slide for selective individual register with the photographic axis of said camera, a bracket arm pivotally secured to and movable with and with respect to one of said frames, tne axis of said pivot being disposed in offset relation to said photographic axis, a disk rotatably mounted on the outer end of said bracket arm for movement in a vertical plane, and a plurality of color screens carried by said disk and rotatably movable therewith into selective individual register with said photographic axis and simultaneously movable as a group with said arm about its pivot axis out of the optical path of said camera.

STEPHEN N. WEKEMAN.

REFERENCES CITED

The following references are of record in the file of this patent:

UNITED STATES PATENTS

| Number | Name | Date |
|---|---|---|
| 2,236,069 | Robinton | Mar. 25, 1941 |
| 1,945,481 | Dilkes | Jan. 30, 1934 |
| 1,946,810 | Rowell | Feb. 13, 1934 |
| 2,239,783 | Heitschmidt | Apr. 29, 1941 |
| 547,855 | Lee | Oct. 15, 1895 |
| 1,530,173 | Harris | Mar. 17, 1925 |
| 666,856 | Ryer | Jan. 29, 1901 |
| 1,892,683 | Robertson | Jan. 3, 1933 |
| 1,820,899 | Greenewalt | Aug. 25, 1931 |
| 2,205,179 | Schultz | June 18, 1940 |
| 2,236,069 | Robinton | Mar. 25, 1941 |
| 403,476 | Kuhn | May 14, 1889 |
| 1,993,101 | Kindelmann et al. | Mar. 5, 1935 |
| 1,270,336 | Schigon | June 25, 1918 |
| 1,626,841 | Kelley et al. | May 3, 1927 |
| 2,117,727 | Jones | May 17, 1938 |
| 1,535,225 | Hays et al. | Apr. 28, 1925 |